Feb. 10, 1953 N. R. GUNDERSON 2,628,150

PICTORIAL REPRESENTATION REPRODUCING HEAD

Filed Oct. 9, 1946 7 Sheets-Sheet 1

NORMAN R. GUNDERSON,
INVENTOR.

BY [signature]

ATTORNEY

Feb. 10, 1953 N. R. GUNDERSON 2,628,150

PICTORIAL REPRESENTATION REPRODUCING HEAD

Filed Oct. 9, 1946 7 Sheets-Sheet 2

NORMAN R. GUNDERSON,
INVENTOR.

BY C. A. Keibel [signature]

ATTORNEY.

PICTORIAL REPRESENTATION REPRODUCING HEAD

Filed Oct. 9, 1946 7 Sheets-Sheet 3

NORMAN R. GUNDERSON,
INVENTOR.

BY [signature]

ATTORNEY.

PICTORIAL REPRESENTATION REPRODUCING HEAD

Filed Oct. 9, 1946 7 Sheets-Sheet 4

NORMAN R. GUNDERSON,
INVENTOR.

BY [signature]

ATTORNEY.

Feb. 10, 1953 N. R. GUNDERSON 2,628,150

PICTORIAL REPRESENTATION REPRODUCING HEAD

Filed Oct. 9, 1946 7 Sheets-Sheet 5

NORMAN R. GUNDERSON,
INVENTOR.

BY [signature]

ATTORNEY.

Feb. 10, 1953 N. R. GUNDERSON 2,628,150

PICTORIAL REPRESENTATION REPRODUCING HEAD

Filed Oct. 9, 1946 7 Sheets-Sheet 6

NORMAN R. GUNDERSON,
INVENTOR.

BY [signature]

ATTORNEY.

PICTORIAL REPRESENTATION REPRODUCING HEAD

Filed Oct. 9, 1946 7 Sheets-Sheet 7

NORMAN R. GUNDERSON,
INVENTOR.

BY [signature]

ATTORNEY

Patented Feb. 10, 1953

2,628,150

UNITED STATES PATENT OFFICE 2,628,150

PICTORIAL REPRESENTATION REPRODUCING HEAD

Norman R. Gunderson, Pasadena, Calif.

Application October 9, 1946, Serial No. 702,174

11 Claims. (Cl. 346—75)

This invention relates generally to reproducing heads adapted for use in making colored pictorial representations, facsimiles, or reproductions of colored subjects. More specifically, it relates to reproducing heads adapted to mix various colored inks and a black ink in accordance with electric signals corresponding to the various colored inks and the black ink, and to apply said mixed atomized inks upon succeeding small, elemental areas or points of a suitable medium, such as paper or the like (which may be mounted upon a suitably driven rotatable and axially movable drum) so that a reproduction in substantially natural colors (or desired colors) is obtained.

This application is a continuation-in-part of my parent application, Serial No. 426,220, filed January 9, 1942, now Patent 2,413,706, issued January 7, 1947, and the reproducing heads described, illustrated and claimed herein are adapted for use in the system disclosed in said parent application, or in the systems disclosed in my copending application, Serial No. 702,173, filed October 9, 1946, now Patent No. 2,560,567, dated July 17, 1951, or in many other color reproduction systems, as will be apparent to those skilled in the art.

Prior art reproducing heads have numerous disadvantages. For example, most prior art reproducing heads have very slow response. In other words, the flow of the various inks lags, to a considerable extent, behind the corresponding electric signal, and if the electric signal is changing rapidly, the flow of the corresponding ink cannot follow the electric signal, and distortion results. Also, most prior art reproducing heads do not properly mix and atomize the inks whereas the reproducing heads of my invention have exceedingly fast accurate response with distortion minimized.

Generally speaking, my invention comprises: an air conduit provided with means for supplying air under pressure to said conduit; at least one nozzle provided with a fixed opening directed into the air stream from said air conduit; an ink conduit for supplying the nozzle with ink; and means for causing ink flow to the nozzle. The term, ink, as used herein, includes any fluid solution dispersion or suspension adapted for use in the system.

In the preferred embodiments of my invention I have employed three colored ink nozzles and a black ink nozzle; however, any desired number might be used.

In the first embodiment of my invention the above referred to "means for causing ink flow" comprises, a piston reciprocable in a cylinder in response to interacting magnetic fields, one of which is controlled by the electric signal corresponding to that ink.

In the second embodiment of my invention, the above referred to "means for causing ink flow" comprises means for generating and modulating a high frequency oscillatory electric current in accordance with an electric signal corresponding to that colored ink, and applying said modulated high frequency current to the ink for heating and expanding same.

With the above points in mind:

It is an object of this invention to provide an improved reproducing head having an exceedingly fast response and a minimum of distortion.

It is a further object of this invention to provide an improved reproducing head having an exceedingly fast response and a minimum of distortion wherein the flow of ink is caused by electromagnetically actuated reciprocating means.

It is a further object of this invention to provide an improved reproducing head having an exceedingly fast response and a minimum of distortion wherein the flow of ink is caused by electrically controlled heating and expansion of the ink.

Other and allied objects will become apparent to those skilled in the art after a careful examination and perusal of the illustrations, specifications and claims appended hereto.

For purposes of illustration reference will be had to the following drawings, of which:

Figures 8, 9, 9A, 10:
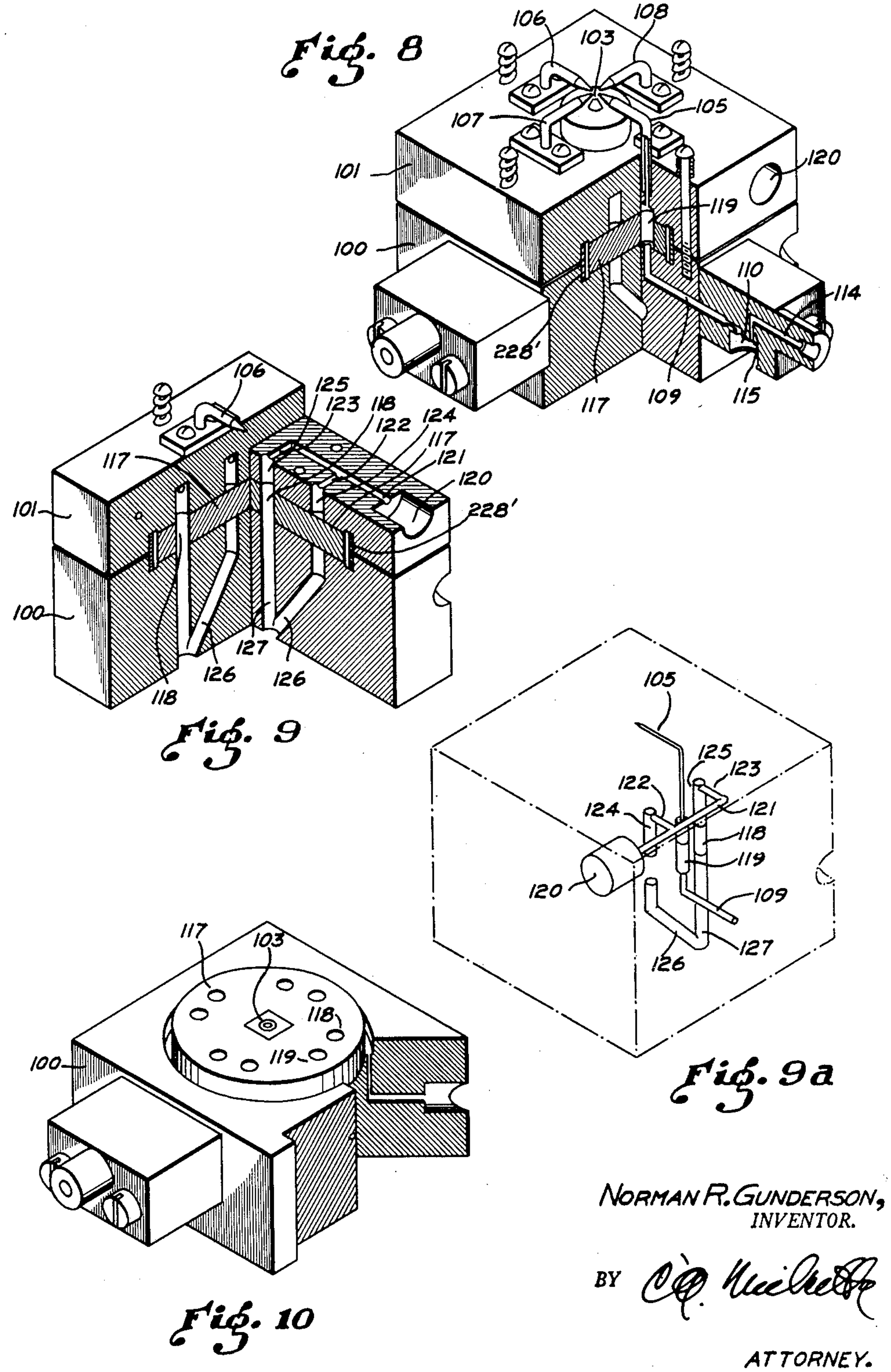
Fig. 8 is an isometric perspective of the reproducing head with a portion thereof cut out.
Fig. 9 is another isometric view of the reproducing head with portions cut out along vertical and horizontal planes.

Fig. 9*a* is a perspective, diagrammatic representation of the conduits associated with a single nozzle of the reproducing head.

Fig. 10 is a perspective view of the lower portion of the reproducing head with a section cut away.

Figure 11:
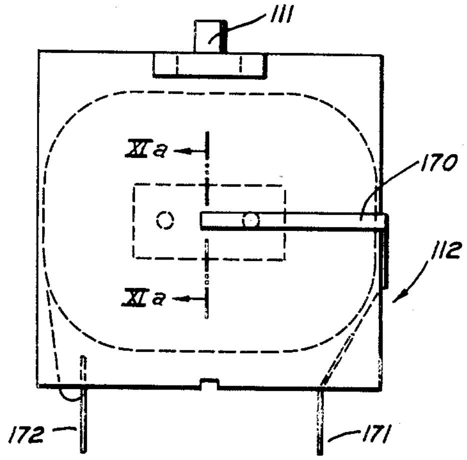

Fig. 11 is a side elevation of one of the moving coils used in the first form of my reproducing head.

Figure 11A:
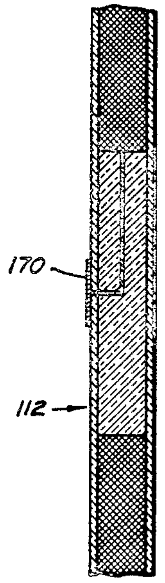

Fig. 11*a* is an enlarged transverse section of the coil taken on line XI*a*—XI*a* of Fig. 11.

Figure 12:
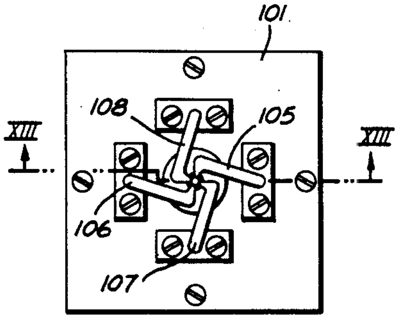

Fig. 12 is a plan view of a modified arrangement of nozzles for use in the reproducing head.

Figure 13:
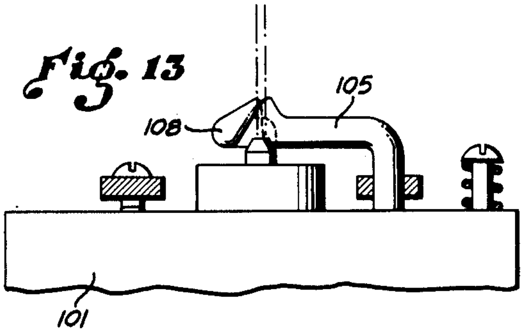

Fig. 13 is a vertical section of Fig. 12 taken along the plane XIII—XIII.

Figure 14:
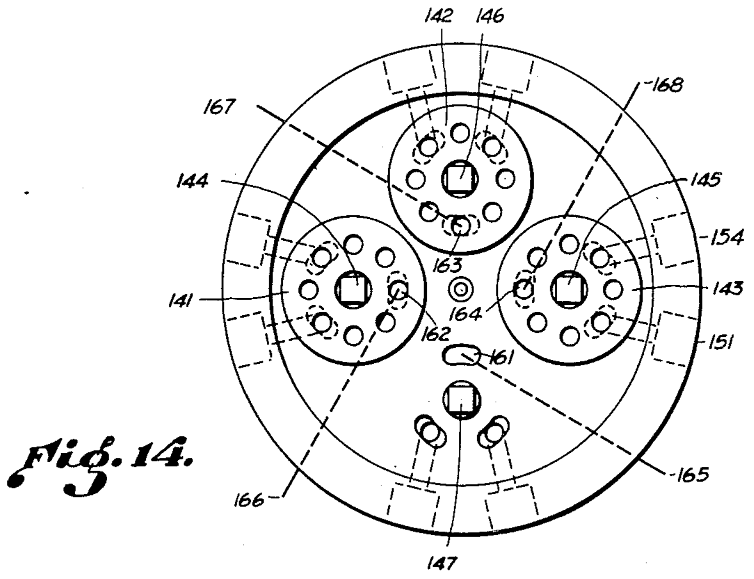

Fig. 14 is a top plan view of a second embodiment of the reproducing head of my invention, with the top plate and nozzles removed.

Figure 15:
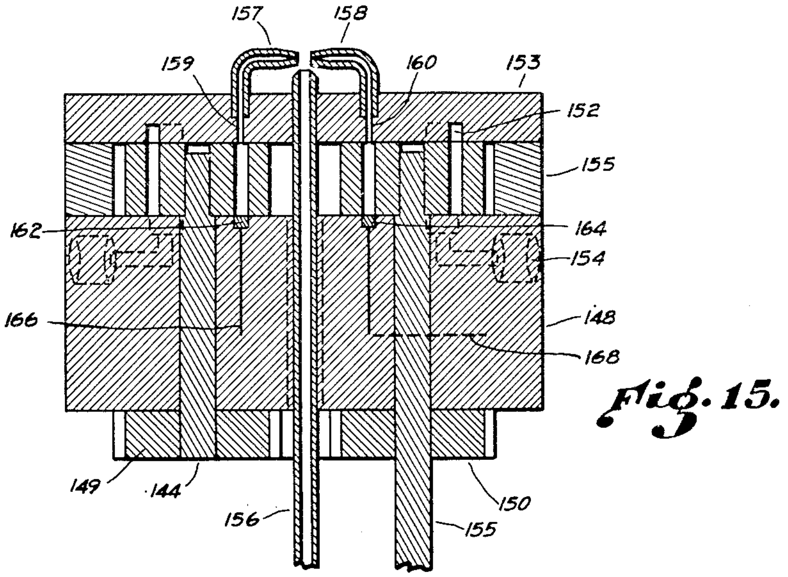

Fig. 15 is a vertical section of the second embodiment of the reproducing head of my invention.

Figure 16:
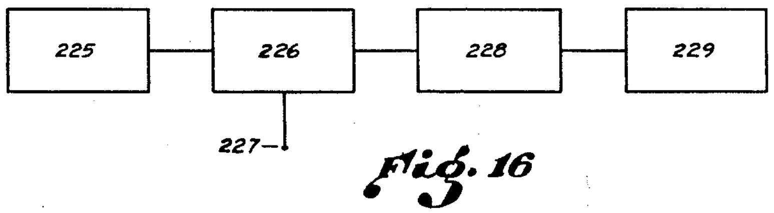

Fig. 16 is a diagrammatic block electrical drawing, illustrative of one way the second form of reproducing head may be controlled.

Figure 17:
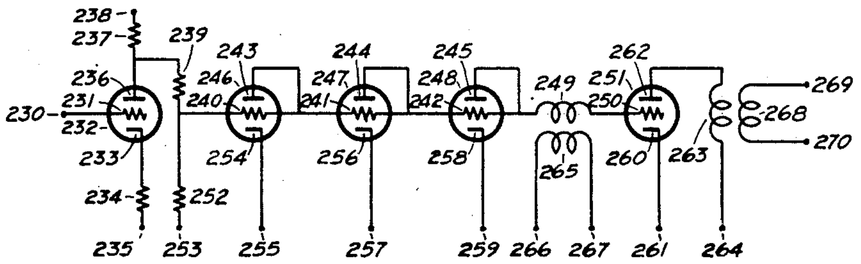

Fig. 17 is a wiring diagram schematically illustrating one form of modulator for use with the second form of reproducing head of my invention.

Figure 1:
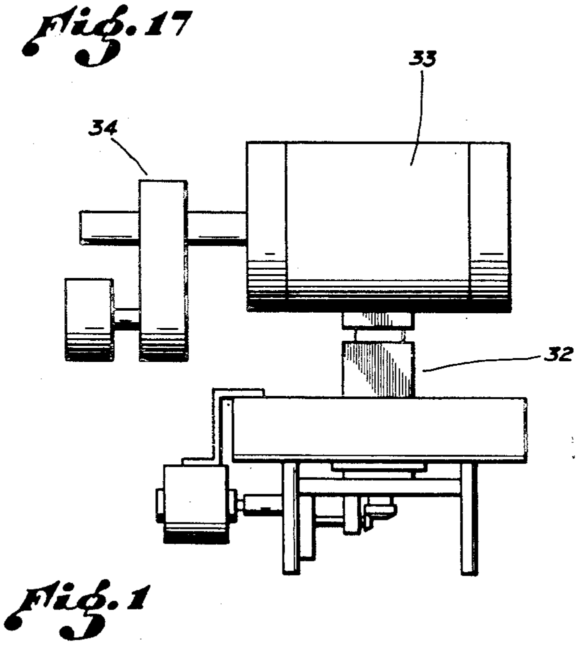
Fig. 1 is a diagrammatic drawing of a reproducing head cooperating with a driven rotatable and axially movable drum upon which is mounted the medium upon which the reproduction is to be formed.
Figure 2:
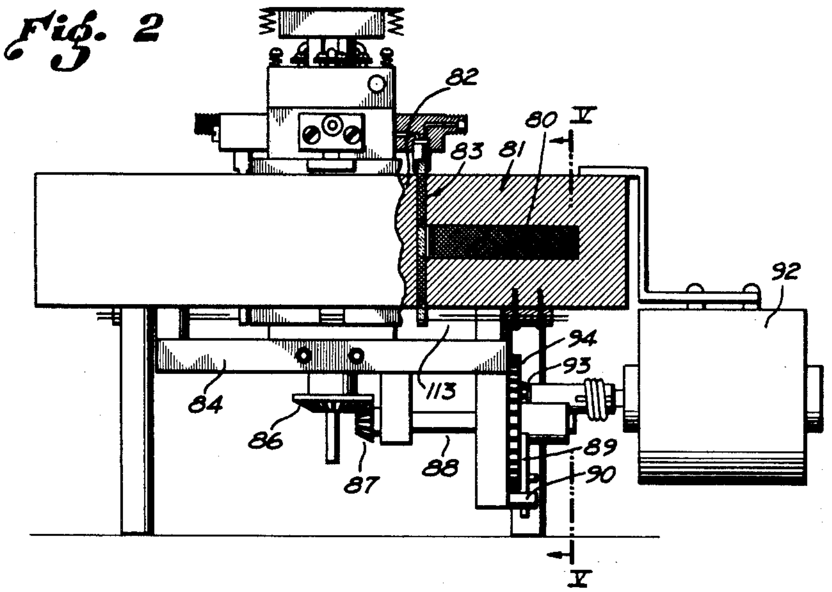
Fig. 2 is a side elevation, partly broken away, of one form of reproducing head.
Figure 3:
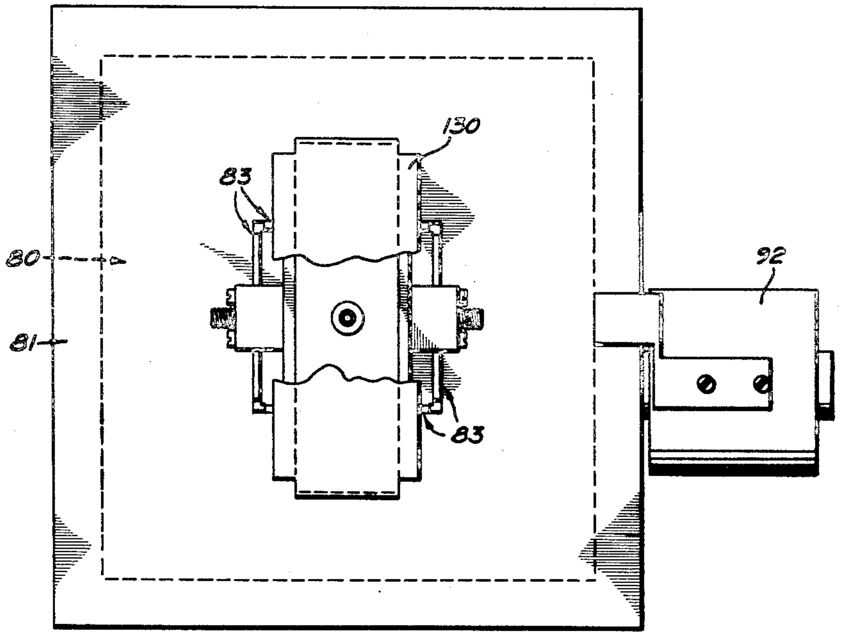
Fig. 3 is a plan view of the reproducing head.
Figure 4:
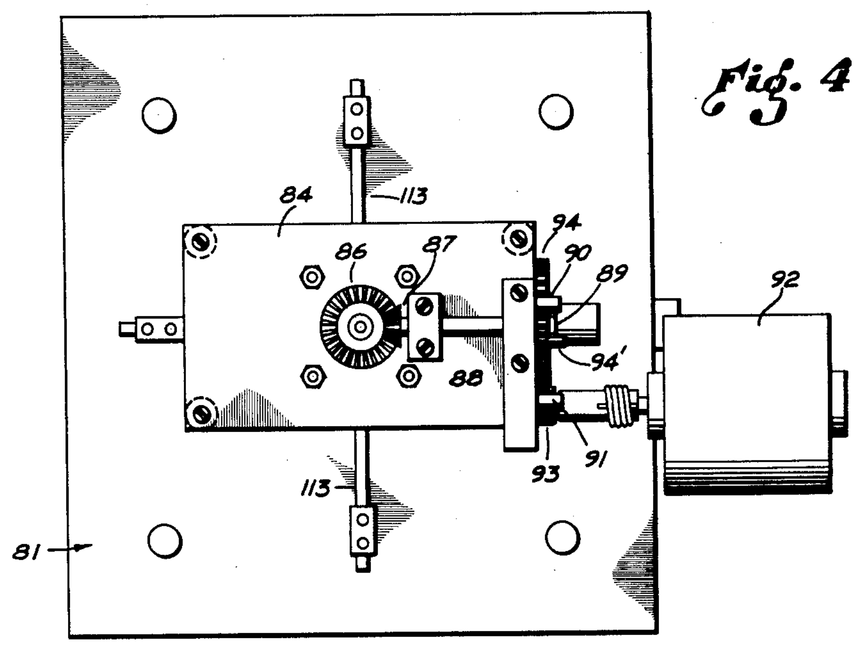
Fig. 4 is a bottom view of the reproducing head.

More specifically, the reproducing head generally indicated at 32 in Fig. 1 consists of a suitably driven rotatable and axially movable drum adapted to mount a suitable medium such as paper or the like and which need not be described in detail. By referring to Figs. 1-13, one form of reproducing head is there shown. As there shown, the body of the reproducing device consists of a hollow, substantially square field coil 80 within the magnetic frame 81. Positioned in the center of this hollow square is a solid magnetic core 82, sufficiently spaced from the inner surfaces of the hollow square so as to permit a readily movable fit to four movable coils, one of the coils being indicated at 83. This structure is supported upon suitable legs, the center armature 82 being supported by the framework 84. Extending vertically through the center of the armature 82 is a hollow rotatable drive shaft 85 provided with a mitre gear 86 at its lower end. This shaft is periodically partially rotated, the partial rotation of this shaft being in timed relation to the rotation of the reproducing drum.

Figure 5:
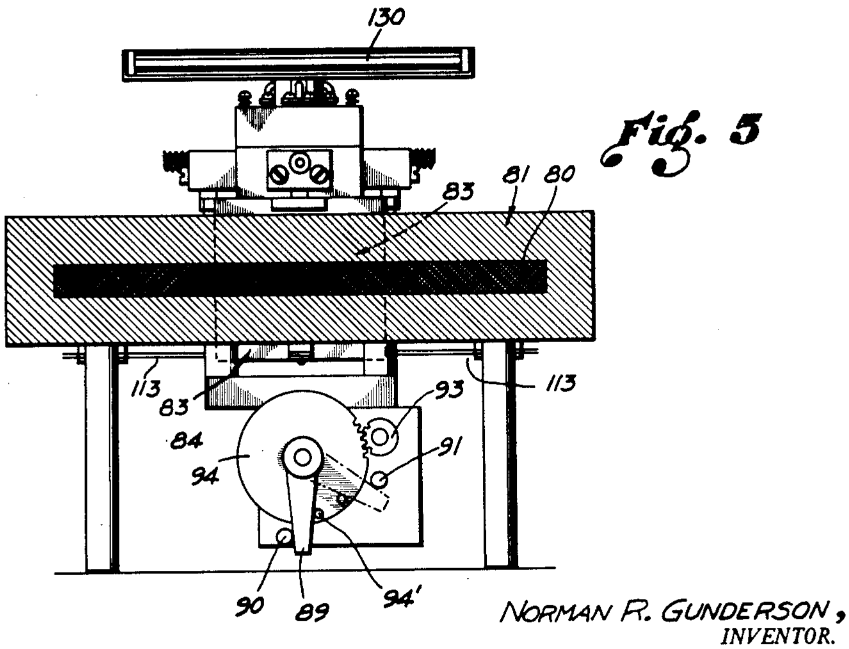
Fig. 5 is a section taken along the plane V—V of Fig. 2.

The mitre gear 86 is shown in engagement with another mitre gear 87 carried by intermittently driven shaft 88 suitably journaled in brackets, the shaft 88 also carrying a stop arm 89 adapted to move against stop pins 90 and 91, as best shown in Fig. 5. The reversible motor 92 drives a gear 93 at suitably timed intervals, the gear 93 being flexibly coupled to the motor 92 and in engagement with a gear 94 which is journaled on shaft 88 and is provided with a pin 94' capable of striking the arm 89 to rapidly move it from the position indicated in full lines in Fig. 5 to that shown in dotted lines and vice versa, in timed relation to the reproducing drum. The motor 92 may be interlocked or controlled by the motor drive to the reproducing drum.

Figures 6, 7:
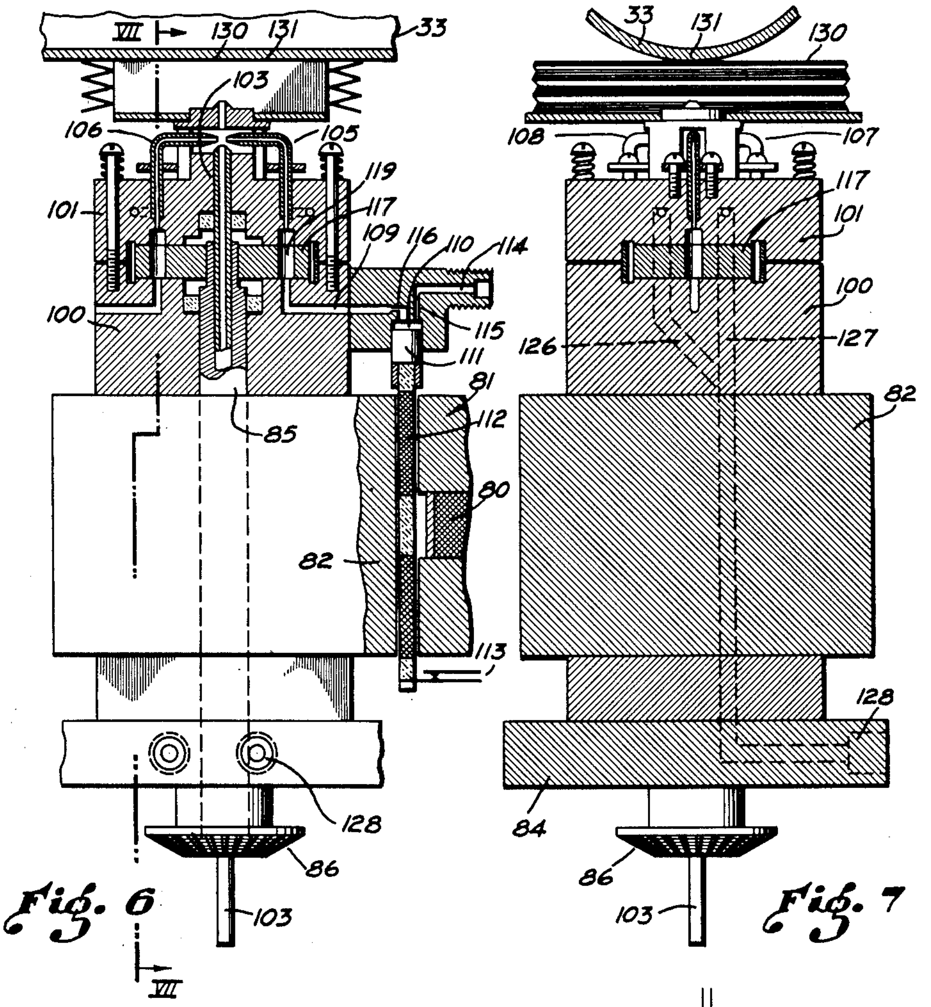
Fig. 6 is an enlarged view through a portion of the reproducing head.
Fig. 7 is a vertical section taken along the plane VII—VII of Fig. 6.

As shown in Figs. 6 to 13 inclusive, the armature 82 is provided with an upward extension or head which may be made of a lower block 100 and an upper block 101 suitably attached thereto, the blocks being preferably of non-magnetic material. Extending through these blocks centrally through the center of the intermittently rotated shaft 85 is an air conduit 103 connected to a source of air at a sufficiently high pressure to atomize ink supplied to such air stream through a plurality of nozzles 105, 106, 107 and 108 carried by the upper block 101. The tips of these nozzles are provided with minute perforations or openings (on the order of 0.004 of an inch). The ends of these nozzles are preferably placed in alignment with the inner surfaces of the air conduit 103 so as to assure substantially complete removal of all ink ejected by the nozzles without creating undesirable suction effect on the ink within the nozzles. Although the nozzles shown in Figs. 6 and 7 are pointed transversely to the air stream, other arrangements may be used, such as for example, that shown in Figs. 12 and 13 wherein the nozzles are upwardly extended into the air stream emitted by conduit 103.

In the drawings a reproducing head having four nozzles is shown, three of these nozzles being adapted to supply colored inks, the fourth nozzle being associated with a source of black ink. In accordance with the present invention, the rate of feed of the inks through the nozzles is controlled in accordance with the variations in the electrical input signals to the reproducing head. By varying the pressure on bodies of ink to which the nozzles are connected, the nozzle 105, for example, may be in communication with a conduit 109 leading to an enlarged chamber 110, the open side of such chamber being closed by a movable piston 111 carried by a movable coil 112. The coil itself is positioned within the magnetic field between the armature 82 and the magnetic frame 81. Each of these moving coils such as 112, is made so as to slidably fit within the gap between one side of the armature and the corresponding side of the magnetic frame and is supplied with current from a color channel or black channel, depending upon the color of the ink being supplied to the air stream by the nozzle.

Figs. 11 and 11*a* illustrate one form of coil which may be employed. As there shown, the coil is preferably of the thin, pancake type, the wire being wound on a suitable insulation core, the entire winding being then impregnated with a suitable self-hardening thermoplastic or thermosetting insulating composition such as Bakelite. The inner terminal of the coil may be connected to a thin metal strip 170 which extends along the surface of the coil to one edge and is there connected to a flexible lead 171. The other flexible lead to the coil is indicated at 172. The piston 111 is preferably of non-magnetic material. Each coil is preferably yieldingly supported as upon one arm of a make and break switch, indicated at 113, such switch being connected to a pump when desired, as described hereinafter. It will be evident that in the event the moving coil 112 is connected to its correlated electric input signal and in the event the conduit 109 and chamber 110 are filled with ink, movements of the coil 112 and the piston 111 carried thereby will result in the imposition of a varying pressure upon the ink in the chamber and conduit, thereby controlling the discharge of ink through the nozzle 105. As the amount of ink in the conduit 109 and chamber 110 is depleted, the piston 111 will move upwardly under the yielding influence of the contact switch 113. In order to minimize the inertia of fluid moving through conduit 109 and permit more rapid changes in the magnitude of flow to take place, a capillary choke 116 may be placed between the chamber 110 and the conduit 109. Moreover, under these conditions it would be highly desirable to employ as viscous an ink as possible in order to assure a more rapid cut off when it is desired to terminate the discharge of ink. When, due to the depletion of ink from chamber 110, the piston 111 has moved upwardly sufficiently to close switch 113, a pump (not shown) is energized by closure of such switch, the pump forcing new ink into chamber 110 through conduit 114 and capillary choke 115.

In actual practice, however, it has been found desirable to employ a relatively viscous pressure applying fluid or liquid for applying pressure to a body of relatively non-viscous ink, such body of ink being then connected to a nozzle. The reason for this arrangement is that if the controlling pressure were applied directly to the relatively non-viscous ink and then suddenly removed therefrom, the ink would continue to flow, being possessed of inertia; thus very poor control of the ink would be had in such a system. It is desirable that the instant the controlling pressure ceases or is reduced the ink also stop flowing or the flow thereof be correspondingly reduced with as little as possible of the before mentioned inertial lag. This is achieved by forcing a relatively viscous fluid at relatively high pressures through a small capillary choke since the back pressure thus caused is so great that almost immediately after the pressure is removed from the viscous fluid said fluid stops flowing, and correspondingly, when the pressure applied to the viscous fluid is reduced, the flow of the viscous fluid is reduced almost immediately with very little inertial lag. However, if the ink is to be supplied through a fine nozzle it cannot be a very viscous fluid but must be relatively non-viscous. Therefore, a compromise is reached in that a pressure applying fluid is used which is relatively viscous and which is adapted to apply pressure through a capillary choke to a relatively non-viscous ink; thus the desired results are attained and inertial lag is minimized.

In the drawing the chamber 110 is shown connected to a conduit 114 through a capillary 115. The conduit 114 is connected to a source of fluid or to a pump adapted to supply fluid under pressure to the chamber 110. The fluid so supplied is preferably very viscous and immiscible with the inks being employed. Fluids having viscosity of about 600 poises, such as viscous hydrocarbon oils have been found suitable. In the event the conduit 114 is connected to a pump, such pump is controlled by the switch 113. The capillary 115 is for the purpose of inhibiting or reducing return or backflow from the chamber 110 into the conduit 114. When the arrangement just described is employed, the piston 111 acts against the viscous liquid in the chamber 110, such viscous liquid extending into the conduit 109 toward the lower portion of a chamber 119 so that it causes displacement of the relatively non-viscous ink in the chamber 119, thus resulting in a flow of ink through the nozzle 105.

Means for supplying ink to this chamber and to the nozzle 105 are provided and such means may comprise a rotatable member 117 mounted upon the end of the rotatable shaft 85, the member 117 being provided with chambers or bores such as the bores 118 and 119, best shown in Fig. 10, Fig. 8 showing the bore or reservoir 119 in alignment and in communication with the conduit 109 and nozzle 105. Variations in pressure in chamber 110 (produced by minute movements of the piston 111) are thereby transmitted by the heavy viscous fluid to the ink in the reservoir 119 and cause regulated discharge of ink through the nozzle 105. It is understood that the presence of the capillary 116 will absorb most of the pressure generated by piston 111 in the chamber 110 so that the variations in pressure between the capillary 116 and the nozzle 105 are of a very low order in comparison with the pressures in the chamber 110. More rapid changes in flow through the nozzle are thus attained without the inertia effects which would normally be expected. Since most inks are somewhat compressible, it is desirable to make the reservoir 119 relatively small and to supply fresh bodies of ink in timed relation with the rotation of the reproducing drum 33. This is accomplished by periodically and alternately introducing the bores 118 and 119 in alignment with the nozzle 105, one of the bores supplying ink to the nozzle while the other is being flushed and recharged.

In Figs. 6, 7, 8, 9*a* and 10 the reservoir 119 is shown in alignment with the oil conduit 109 and the ink nozzle 105. The reservoir 118 is in an inoperative position with respect to the nozzle but it is in a recharging position and flushing position with respect to an ink supply which is being passed through the reservoir 118 and discharged therefrom. One such ink supply line in its relationship to reservoirs 118 and 119 is shown in Fig. 9*a*. It will be noted that the upper block 101 is provided with a port 120 adapted to be connected to a source of ink or an ink pump, such port 120 communicating with conduit 121 having branches 122 and 123 and vertical ducts 124 and 125 whose open ends abut the upper surface of the rotatable member 117. In the position shown in Fig. 9*a*, port 120 is in communication with reservoir 118 of the rotatable member 117 by conduits 121, 123 and 125. The lower block 100 of the reproducing head is provided with conduits or discharge tubes 126 and 127 which join and extend downwardly through the armature 82 and communicate with discharge ports such as the port 128 formed in the supporting bracket of the device.

Discharge port 128 is in communication with an ink storage reservoir. The ink is pumped from this reservoir through a plug of cotton or glass wool in order to remove any drops of oil which may be present and is then passed through a chamber for the separation of any possible air bubbles. The ink then flows into port 120, out of port 128 and back into the storage reservoir. Oil which has been flushed from the ink reservoirs 118 and 119 accumulates in the storage reservoir either above or below the ink according to its density. Periodically the oil is drained from the storage reservoir and the ink is replenished. The ink pump may be a small diaphragm pump such as an automobile gasoline pump.

The circular element 117 is partially rotated in timed relation to the means for driving the reproducing drum so as to periodically introduce a bore filled with fresh ink into the ink conduit leading to a nozzle. In Fig. 9*a* the bore 118 is shown being flushed whereas bore 119 has been introduced into the ink conduit. When the circular member 117 is partially rotated it will be rotated so as to move the bore 119 in alignment with the flushing bore 124, the refilled and recharged bore 118 being then placed in alignment with the ink conduit 109. Preferably the bores 118 and 119 are spaced a distance equal to their diameter along the arc of their movement so that the change from bore 118 to 119 and vice versa is almost instantaneous.

It is to be understood that although the conduits associated with nozzle 105 have been described in detail, similar arrangements of conduits, forks and channels are associated with each of the other nozzles.

Fig. 10 discloses means for supplying a lubricating oil to the periphery of the intermittently, partly rotated circular member 117, a suitable sealing ring 228' being positioned around the member to prevent oil leakage between the blocks 100 and 101. Also, in order to provide for the flow of this lubricating oil a hole is provided in member 117 from its outside edge or periphery to its centrally located square hole. The pressure of the oil in the sealed chamber thus formed is maintained at a value greater than the maximum pressure in any of the ink reservoirs. By this means the inks are prevented from leaking out along the sliding surfaces of member 117. Instead, the lubricating oil leaks into the reservoirs along the sliding surfaces, but due to the high viscosity of the oil the leakage is negligible.

The reproducing head of this invention is adapted to be used in making colored facsimiles or reproductions. As more particularly pointed out in the before mentioned parent application, Serial No. 426,220, now Patent 2,413,706 issued January 7, 1947, a plurality of color separation photographic images may be scanned by suitable scanning means including electron multiplier photocells, the output of which may then be fed into suitable logarithmic amplifiers. The output from the logarithmic amplifiers may then be fed into a suitable mixer adapted to similarly modify all of the color signals so as to reduce the color signal corresponding to the least ink coverage, to a value corresponding to no ink coverage. The mixer is also adapted to generate a black output signal corresponding to said modification of the color signals.

The modified color signals may also be corrected for the overlapping of the color absorption characteristics of the colored inks to be used in reproduction. The color signals and the black signal may then be fed into the reproducing head of this invention as set forth below.

The color reproduction system described in copending application, Serial No. 702,173, filed October 9, 1946, which is also a continuation-in-part of said parent application, Serial No. 426,220, now Patent 2,413,706 issued January 7, 1947, is also adapted to cooperate with the reproducing head of this invention. Said system functions in a manner somewhat similar to the system described in said parent application.

In general, therefore, each of the moving coils, such as the coil 112, is connected to its separate color input electric signal and controls the supply of ink to a nozzle. Mounted above the nozzles is a shield 130 having a minute opening or perforation 131 therein, said perforation being in axial alignment with the air conduit 103. The reproducing drum may either be in contact with the shield 130 or slightly spaced therefrom. Ink supplied to the upwardly directed air stream is virtually atomized and blown against the shield 130, a desired proportion of ink passing through the aperture 131 and forming the desired spot or line of suitable color on the paper carried by the reproducing drum 33. Mixing of different colored inks takes place in the air stream and the distance between the tips of the nozzles and the shield 130 should be sufficient to permit mixing of the inks before they pass through the aperture 131. In order to give the finest possible spray the inks may be liquids of low viscosity and low surface tension such as solutions of dyes in methyl alcohol.

A second embodiment of the reproducing head of my invention is shown in Figs. 14 and 15 and the electrical control circuits therefor being shown in Figs. 16 and 17. The reproducing head shown in Figs. 14 and 15 contains four ink reservoir wheels or rotatable members (one for each ink), three of which are shown as 141, 142 and 143 in Fig. 14. Each of these wheels is mounted for rotation by means of a shaft 144, 145, 146 and 147, which extends through the block 148 and has a driving gear mounted on the other end thereof such as gears 149 and 150 shown in Fig. 15, it being understood that the other two shafts are also provided with suitable driving gears. These four gears intermesh with each other so that if one shaft turns, the other must turn also. A suitable driving means is connected to the shaft 145 so that the four ink reservoir wheels may be rotated at a suitable speed.

The holes in the ink reservoir wheels (best shown in Fig. 14) form the ink reservoirs or chambers and each ink reservoir or chamber is flushed out at each revolution with the corresponding ink. This is done as follows: Assuming that the ink reservoir wheel 143 rotates in a clockwise direction, the ink enters a port 151 in the block 148 and flows upward through the ink reservoir in line with this port into slot 152 in the upper plate 153. Next it flows down through the ink reservoir opposite the port 154 and then flows out at port 154. It may be mentioned that a suitable pump such as a small centrifugal or gear pump and a large ink reservoir may be provided for flushing the ink from each of the ink reservoir wheels. The ink in each of these large reservoirs is maintained at uniform temperature by suitable means. Such means are well known in the art and need not be shown.

Positioned around the four ink reservoir wheels and between the upper plate 153 and the lower block 148 is an annular ring 155 adapted to seal in and enclose the space containing the four ink reservoir wheels. Passing longitudinally through the lower block 148 and through the enclosed chamber containing the ink reservoir wheels and through the upper plate 153 is an air conduit 156 adapted to be supplied with air under pressure from suitable means not shown.

Positioned upon the upper plate 153 are four nozzles (two of which, 157 and 158, are shown in Fig. 15 connected to tubes 159 and 160 which pass through the plate 153 to points opposite their ink reservoirs, it being understood that the other two nozzles are also provided with similar tubes and that all of said tubes may be capillary tubes). The nozzles are provided with tiny spray jets or orifices inwardly directed toward the air stream emitted by the air conduit 156 so as to be atomized and mixed thereby. The atomized, mixed inks are then adapted to be sprayed through a suitable shield upon a suitable medium such as paper or the like, mounted upon a rotatable, axially movable, driven drum, such as shown in the first embodiment of this invention.

The flow of each ink to the corresponding nozzle or spray jet is caused by heating and expanding it by the passage of a high frequency alternating electric current. The ink reservoir wheels are made of an electrical insulator such as methyl methacrylate resin or other suitable material and the upper electrode for each wheel is the plate 153 which is made of metal or other suitable electrically conductive material. The lower block 148 is also preferably made of some suitable insulating material such as methyl methacrylate resin, phenol-formaldehyde resin or other similar material.

Lower electrically conductive electrodes are mounted in the lower block 148 and are shown at 161, 162, 163 and 164. These electrodes are provided with insulated leads or connecting wires 165, 166, 167 and 168. The heating cycle for each reservoir is that portion of its path in which it is in contact with its corresponding electrodes. The upper plate 153 is slotted so that the ink chamber or reservoir is connected to its tube and to the spray jet of a nozzle during all parts of its heating cycle when the lower electrode is in contact with the ink. The flow of ink to the spray jet of the nozzle is then caused by passage of the corresponding electric current. The flow is proportional to the rate of heating or to the current squared multiplied by the resistance, in which the current is the actual current passing through the ink in the ink chamber or reservoir and the resistance is the effective resistance between electrodes in the ink chamber or reservoir. This heating effect may be greatly increased by dissolving salt or the like in the ink for increasing the electrical conductivity thereof.

Due to the very short time of the heating cycle, the heat transfer from the ink to the walls of the container or chamber causes only a negligible change in flow to the spray jet of the nozzle. Therefore, it should be emphasized that this system has very little time lag. In other words, it has an extremely fast response because there is no time lag in the rate of heating or the rate of flow of the ink behind the electric current passed therethrough. Also, since the electrical load is a resistive one, there can be no lag in current behind applied voltage due to inductive or capacitive effects. Practically all of the time lag in the flow will then be due to the compression of the liquid due to the change in pressure on the liquid occurring with changes of heating rate and changes in flow of the liquid. This effect can be reduced to a negligible value by making the volume of liquid connected to the spray jet of the nozzle sufficiently small.

It should be noted that the effect of heating losses from the liquid to the container are minimized until they are negligible. This is done because the heating chamber is separate from the tube carrying the ink from the ink chamber to the spray jet of the nozzle. At the beginning of the heating cycle the temperature of the ink is the same as that of the ink chamber so that the heat transfer is zero. As the electric current is passed through the liquid and heat is generated in the liquid, the temperature of the liquid rises and the heat transfer from the liquid to the ink chamber becomes greater and greater. As soon as the temperature of the ink reaches a point at which the heat loss from the ink causes an appreciable error or reduction in the flow of the ink from the ink chamber, then the ink reservoir wheel revolves and a new ink chamber is substituted for the old one. The ink in the ink chamber now has the same temperature as the walls of the ink chamber so that heat loss is zero and no error results from heat loss.

Although I have described the construction and operation of one ink reservoir, spray nozzle and associated elements, etc., corresponding to one ink channel, the description also applies to the other three ink reservoir wheels, spray nozzles and associated parts.

Referring to Fig. 16, a diagrammatic electrical block drawing is shown indicating the manner in which the high frequency heating of the liquid in the ink chambers of the reproducing head shown in Figs. 14 and 15 may be accomplished. Referring to said Fig. 16, a radio frequency oscillator 225 is adapted to generate a suitable high frequency alternating current which is fed into a modulator 226. An input signal indicated at 227 is also fed into the modulator for controlling the high frequency alternating current. The modulated radio frequency output from the modulator 226 is then fed into a power amplifier 228 and is then fed from the power amplifier 228 to the upper and lower electrodes corresponding to one color channel of the reproducing head indicated at 229. Although the diagrammatic electrical block drawing Fig. 16, shows the system applied to one channel only, corresponding to one ink, the description applies equally as well to the other three inks.

Fig. 17 illustrates one form of modulator such as that generally indicated at 226 in Fig. 16. The input signal corresponding to 227 in Fig. 16 is applied to input terminal 230 in Fig. 17. The input terminal 230 is connected to the grid 231 of a phase inverter tube 232. The cathode 233 of the phase inverter tube 232 is connected through a suitable cathode resistor 234 to negative power input terminal 235. The anode 236 of the phase inverter tube 232 in connected through a plate resistor 237 to positive power input terminal 238. The anode 236 of the phase inverter tube 232 is also connected through a resistor 239 to the control grids 240, 241, 242 and the anodes 243, 244 and 245, respectively, of electron tubes 246, 247 and 248 and through radio frequency transformer secondary winding 249 to the grid 250 of the modulator 251.

The before mentioned grids, anodes and oscillator transformer secondary winding are also connected through a resistor 252 to negative power input terminal 253. The cathode 254 of the electron tube 246 is connected to negative power input terminal 255. The cathode 256 of the electron tube 247 is connected to negative power input terminal 257. The cathode 258 of electron tube 248 is connected to negative power input terminal 259. The cathode 260 of the modulator tube 251 is connected to negative power input terminal 261

The anode 262 of the modulator tube 251 is connected through the primary winding 263 of an output frequency transformer to positive power input terminal 264. The primary winding 265 of the oscillator radio frequency transformer has the opposite ends thereof connected to input terminals 266 and 267 which are adapted to be connected to radio frequency oscillator which is not shown since such oscillators are well known in the art. The secondary winding 268 of the output radio frequency transformer has the opposite ends thereof connected to output terminals 269 and 270 which are adapted to be connected to the upper and lower electrodes at the upper and lower ends of one ink chamber in the reproducing head shown in Figs. 14 and 15.

Similar systems are utilized for each of the other ink channels. One essential requirement of the modulator is that it modulate the high frequency alternating voltage in such a way that the output voltage from the modulator is proportional to the square root of the input signal voltage. This is due to the fact that the heating effect of the current passed through the ink in the reproducing head is proportional to the current squared times the resistance of the ink.

In the system shown in Fig. 17, the phase inverter tube 232 is used so as to cause the reproducing head to produce an increase in the flow of ink in response to a more negative input signal. The phase inverter tube may be dispensed with entirely if it is desired to have the flow of ink from the reproducing head function oppositely from that described.

The electron tubes 246, 247 and 248 together form a virtually square root amplifier. Each of the tubes 246, 247 and 248 acts as a rectifier and draws current when its grid is more positive than its cathode. This causes a reduction in the rate of increase of grid voltage of the tubes 246, 247, 248 and the modulator tube 251 with constant rate of change of the grid voltage of the phase inverter tube 232. By adjusting the voltages of the cathodes 254, 256 and 258 of the three electron tubes 246, 247 and 248, respectively, to the proper values, a nonlinear amplification may be obtained which may be made to closely approximate a square root curve. Thus, the output at terminals 269 and 270 is a radio frequency alternating current so modulated that the heating effect thereof will vary linearly with the input signal delivered to input terminal 230.

It should be emphasized that numerous possible modifications of the second embodiment of my invention and the electrical control system thereof are comprehended and included in the scope of this invention. For example, many ways of modulating a high frequency alternating current so as to obtain a heating effect virtually linear with respect to the input signal to the system are possible.

Numerous modifications and variations of this invention are possible and are included herein. For example, in the first embodiment of my invention, only a single ink reservoir wheel or rotatable member is utilized which oscillates back and forth, whereas in the second embodiment of this invention individual rotating ink reservoirs are used, one for each ink and they rotate continuously in a given direction. The said system employing four rotating wheels may be incorporated in the first embodiment of my invention with the means for causing the ink flow being the piston enclosed within a cylinder and actuated electro-magnetically, as shown in the first form of my invention. Also, if desired, the second high frequency heating form of my invention may utilize a single ink reservoir wheel oscillated back and forth in the manner shown in the first embodiment of my invention. If desired, the second form of my invention employing electrical heating of the ink for causing corresponding ink flow variations may be employed in conjunction with portions of the first form of my invention. For example, such electric heating means may be employed for heating the liquid contained in the chamber 118 of the first form of my invention in place of the electromagnetically controlled piston heretofore described and illustrated in the first form of my invention.

The examples described and illustrated herein are exemplary only and are not intended to limit the scope of this invention which is to be limited only by the appended claims.

I claim:

1. A reproducing head adapted for use in the reproduction of pictorial representations, comprising: a movable coil in a magnetic field, said coil being permitted minute movements responsive to electric signals flowing therethrough; an air conduit; means for supplying air under pressure to said conduit; a nozzle provided with a fixed opening directed into the air stream from said air conduit; an ink conduit communicating the nozzle with a source of ink; an enlarged chamber formed in said head; a third conduit communicating said source of ink with said enlarged chamber; and a piston in the enlarged chamber, said piston being operably connected to said movable coil.

2. In an apparatus of the character defined in claim 1: means for supplying a viscous fluid to the enlarged chamber; and a capillary choke in said third conduit between said chamber and the said source of ink.

3. In an apparatus of the character defined in claim 1: means for supplying a viscous fluid to the enlarged chamber; a capillary choke in said third conduit between said chamber and the source of ink; and means positioned between the fixed opening of the nozzle and said choke for supplying ink to said ink conduit.

4. A reproducing head adapted for use in the reproduction of pictorial representations comprising: a field coil; a magnetic frame and armature adapted to generate a magnetic field; a movable coil suspended in the magnetic field between said frame and armature, said coil being permitted minute movements responsive to electric signals flowing therethrough; an air conduit; means for supplying air under pressure to said conduit; a nozzle provided with a fixed opening directed into the air stream from said air conduit; an ink conduit communicating the nozzle with a source of ink; an enlarged chamber formed in said head; a third conduit communicating said source of ink with said enlarged chamber; a capillary choke in said third conduit; and a piston in the enlarged chamber, said piston being operably connected to said movable coil whereby movement of the piston in said chamber controls the pressure of ink in the conduit leading to the nozzle and the flow of ink therethrough.

5. In combination with the apparatus defined in claim 4: a fluid supply line to said enlarged chamber; a pump in said line; a capillary choke between said pump and enlarged chamber and adjacent said chamber; and means controlled by the position of the moving coil for energizing the pump.

6. In combination with the apparatus defined in claim 4: means for supplying fresh ink to said ink source, said means being positioned between said enlarged chamber and the fixed opening of the nozzle.

7. In combination with the apparatus defined in claim 4: means for supplying fresh ink to said ink source, said means being positioned between said enlarged chamber and the fixed opening of the nozzle; said means including a rotatable member provided with bores adapted to be inserted into communication with said ink conduit alternately; and means for flushing the bores not in communication with the ink conduit.

8. A reproducing head adapted for use in the reproduction of pictorial representations comprising: a field coil, a magnetic frame and armature adapted to generate a magnetic field; a movable coil suspended in the magnetic field between said frame and armature; an air conduit; means for supplying air under pressure to said conduit; a nozzle directed into the air stream from said conduit; an ink conduit communicating the nozzle with a source of ink; an enlarged chamber formed in said head; a third conduit communicating said source of ink with said enlarged chamber; a viscous liquid in said third conduit and chamber; a capillary choke in said third conduit; a piston slidably mounted in said enlarged chamber, said piston being operably connected to said moving coil; and means for supplying viscous liquid to the enlarged chamber.

9. An apparatus for controlling the flow of a relatively non-viscous liquid through an orifice comprising: a conduit for supplying the orifice with the non-viscous fluid; a chamber adapted to contain a relatively viscous liquid, said chamber being connected to said conduit by a capillary choke; means for controllably applying pressure to the viscous fluid in the chamber for forcing same through the capillary choke and displacing the non-viscous fluid in the conduit; and means for supplying the conduit with the non-viscous fluid at a point between the capillary choke and the orifice.

10. A reproducing head adapted for use in the reproduction of pictorial representations in response to an input electric signal comprising: an air conduit; means for supplying air under pressure to said conduit; a nozzle provided with a fixed opening directed into the air stream from said air conduit; an ink conduit for supplying the nozzle with ink; means in said ink conduit for replenishing the ink therein, said means including a movable member provided with a plurality of parallel bores adapted to be sequentially inserted into said ink conduit and means for flushing the bores not in communication with the ink conduit; and means continuously responsive to said input electric signal for causing flow of ink out of the nozzle at a rate virtually corresponding to said input signal.

11. A reproducing head adapted for use in the reproduction of pictorial representations in response to an input electric signal comprising: an air conduit; means for supplying air under pressure to said conduit; a nozzle provided with a fixed opening directed into the air stream from said air conduit; an ink conduit for supplying the nozzle with ink; means communicating with said ink conduit for supplying ink thereto, said means including a movable member having a plurality of bores formed therein, said member being adapted to insert, sequentially, each of said bores into communication with said ink conduit, and means for replenishing the ink in a bore not in communication with the ink conduit; and means continuously responsive to said input electric signal for causing flow of ink out of the nozzle at a rate virtually corresponding to said input signal.

NORMAN R. GUNDERSON.

REFERENCES CITED

The following references are of record in the file of this patent:

UNITED STATES PATENTS

| Number | Name | Date |
|---|---|---|
| 1,306,985 | Williams | June 17, 1919 |
| 1,627,701 | Hall | May 10, 1927 |
| 1,995,424 | Guiness | Mar. 26, 1935 |
| 2,013,639 | Steinhart et al. | Sept. 3, 1935 |
| 2,100,204 | Shore | Nov. 23, 1937 |
| 2,143,376 | Hansell | Jan. 10, 1939 |
| 2,157,549 | Lindenblad | May 9, 1939 |
| 2,172,539 | Kimmich | Sept. 12, 1939 |
| 2,175,869 | Bernarde | Oct. 10, 1939 |
| 2,404,217 | Collins | July 16, 1946 |
| 2,410,692 | Strobell | Nov. 5, 1946 |
| 2,433,812 | Hastings et al. | Dec. 30, 1947 |